United States Patent [19]

Cummings

[11] 4,416,062

[45] Nov. 22, 1983

[54] SELF CENTERING PIPE CUTTING DEVICE

[76] Inventor: John R. Cummings, 3687 S. 2200 West, West Valley City, Utah 84119

[21] Appl. No.: 292,641

[22] Filed: Aug. 13, 1981

[51] Int. Cl.³ .............................................. B23D 21/08
[52] U.S. Cl. ........................................... 30/101; 30/99
[58] Field of Search ...................... 30/92–96, 30/98, 99, 101, 102; 81/59.1, 163

[56] References Cited

U.S. PATENT DOCUMENTS

| | | | |
|---|---|---|---|
| 1,732,160 | 10/1929 | Frye | 30/101 |
| 1,904,621 | 4/1933 | Kounovsky | 81/59.1 |
| 2,112,565 | 3/1938 | Hare | 81/163 X |
| 2,447,371 | 8/1948 | Sipsma et al. | 30/99 |
| 3,715,804 | 2/1973 | Kelley | 30/99 X |

Primary Examiner—Frederick R. Schmidt
Assistant Examiner—Debra S. Meislin
Attorney, Agent, or Firm—Thorpe, North & Western

[57] ABSTRACT

A self centering pipe cutting device having opposing cutting and roller support assemblies which are automatically advanced in concurrent, converging relationship as the cutting device is rotated about the pipe being cut. A ratchet and advancing gear adapt the device for use in restricted areas of movement and provides continuous advancement of the cutting member. A firm grip and concentric cutting path are maintained by track guides which operate to control the direction of cutter and roller assembly movement in a linear course during operation.

8 Claims, 2 Drawing Figures

SELF CENTERING PIPE CUTTING DEVICE

BACKGROUND OF THE INVENTION

1. Field of the Invention

This invention pertains to a small pipe cutting device adapted for use in restricted or confined spaces. More particularly, the subject invention relates to a pipe cutting device which automatically advances the cutting tool in response to ratchet-like movement of the device.

2. Prior Art

A variety of pipe cutting devices have been developed over the years having configurations which appear to be generally adapted for use in cutting small pipe in confined areas. Such small pipe would generally be described as pipe having a diameter of an inch and a half or less, and more often in a range of one-half inch to one inch in diameter. Illustrative of such piping is the copper tubing which is utilized in plumbing systems and related fluid and gas transmission lines. In making repairs on broken pipe or performing other work which requires cutting an existing pipe in place, the available work space for rotating a cutting tool around a pipe is frequently limited. For example, the copper tubing within a residence is typically run between floor joists and may often be anchored in hard-to-reach positions. Frequently, repair work must be conducted through a small opening in a floor or ceiling and on a pipe which may permit only ten to twenty degrees of rotational movement with respect to the cutting tool.

A number of mechanical configurations have been developed to meet some of the difficulty encountered under such circumstances and are illustrated by the following patents: U.S. Pat. Nos. 4,157,615 and 4,177,557 of Courty; U.S. Pat. No. 2,769,235 by Martois, U.S. Pat. Nos. 2,447,371 and 3,715,804 by Kelly and U.S. Pat. No. 882,432 by Thomas. Although these various devices provide the means for applying a cutting force at the exterior perimeter of the tube, the various structures illustrated fail to provide automatic adjustment of this cutting surface in a manner which provides maximum stability of the cutting tool as it is driven around the pipe exterior. Instead, the prior art devices are subject to premature release of the pipe, uncontrolled deviation from the proper planar cutting path and similar problems which arise from the inability of the tool to be retained in firm, stable contact with the cutting edge and clamped pipe in proper orientation.

OBJECTS AND SUMMARY OF THE INVENTION

It is therefore an object of the present invention to provide an improved tube cutting device which maintains a firm grip on the subject tube and preserves proper orientation of the cutting tool along a more perfectly circular path.

It is a further object of the present invention to provide a pipe cutting device in which the supported tube remains in a substantially fixed orientation with respect to the rotating cutting section and supporting sections of the device to maintain an improved cutting path.

It is a still further object of this invention to provide a pipe cutting device which includes automatic adjustment of cutting and supporting rollers which respond to rotation of the cutting blade, yet remain in substantially concentric movement patterns around the central axis of the pipe.

An additional object of this invention is to provide such a cutting tool which can be easily manufactured and includes a minimal amount of complicated hardware assembly.

These and other objectives are realized in a self centering pipe cutting device which includes a handle assembly and attached cutter support frame which is configured to partially circumscribe a pipe cutting area into which a pipe may be inserted through a gap between the ends of the pipe cutter support frame. A pair of cutter guide plates are rotatably positioned at opposing sides of the support frame and include means for coupling these respective plates into a fixed, substantially parallel orientation with respect to each other. Each guide plate has an elongate opening or mouth which permits placement of the pipe in a central location within the pipe cutting area. A pair of linear track guides are formed on the respective interior faces of the guide plates and are positioned in parallel orientation to provide a track for linear movement of a cutter assembly and roller support assembly. The cutter assembly comprises a tracking body having upper and lower tracking means configured to follow the respective linear track guides on the opposing interfaces of the cutter guide plates. A cutting tool is mounted at an edge of the cutter assembly toward the center of the guide plates in orientation adapted for contacting and cutting an external circumferential path around an inserted path. The roller support assembly is likewise positioned in tracking orientation along the linear track guides on the opposing faces of the guideplates. The roller support assembly includes the upper and lower tracking means and a pair of support rollers rotatably mounted at an edge of the roller assembly toward the center of the guide plates in opposing orientation to the cutting tool. This orientation is such that a line parallel to said linear track guides which passes through the cutting contact point of the cutting tool, also passes midway between the pair of support rollers. Adjustment means are included to advance the cutter assembly and roller assembly in simultaneous converging or diverging direction, depending upon the direction of force applied to a drive means coupled to the adjustment means. This adjustment means is fixed in position with respect to the guide plates such that the converging and diverging directions are parallel with the line passing through the cutting point of the tool and midsection of the roller pair. A ratchet and pawl mechanism is coupled between the cutter support frame and rotatable guide plates to actuate rotational movement of the guide plates and attached cutter and roller assemblies in response to rotation of the handle assembly.

The subject device is operated by placing a pipe within the elongate slot, through the gap in the cutter support frame. The cutter assembly and roller assembly are simultaneously advanced in a converging direction to clamp the pipe at a common central axis between the pipe and the respective cutter and roller assembly. Under the teachings of the present invention, both the cutter and roller assemblies are subject only to linear movement along a line which is colinear with a diameter of the inserted pipe. Following each rotation of the cutting wheel around the pipe, an advanced screw and coupled worm gear are driven by an advance mechanism to automatically shift the roller assembly and cutter assembly equal distances in a converging radial direction to provide a new cutting force along the cutting path of the pipe.

By maintaining the movement of the cutting assembly with attached cutting tool and roller assembly in co-linear orientation, the pipe remains rigidly fixed within the cutting device. Furthermore, the cutting path remains more stable because of the absence of tangential forces which operate to dislocate the pipe from its normal cutting path. Under the present structure, all forces applied to the pipe are radial forces which tend to stabilize the pipe in its proper concentric orientation with the path of the support rollers and cutting tool.

Additional objects and features of the subject invention will become apparent to those skilled in the art, based upon the following detailed description and accompanying drawings.

DETAILED DESCRIPTION OF THE DRAWINGS

DETAILED DESCRIPTION OF THE INVENTION

Figure 1:
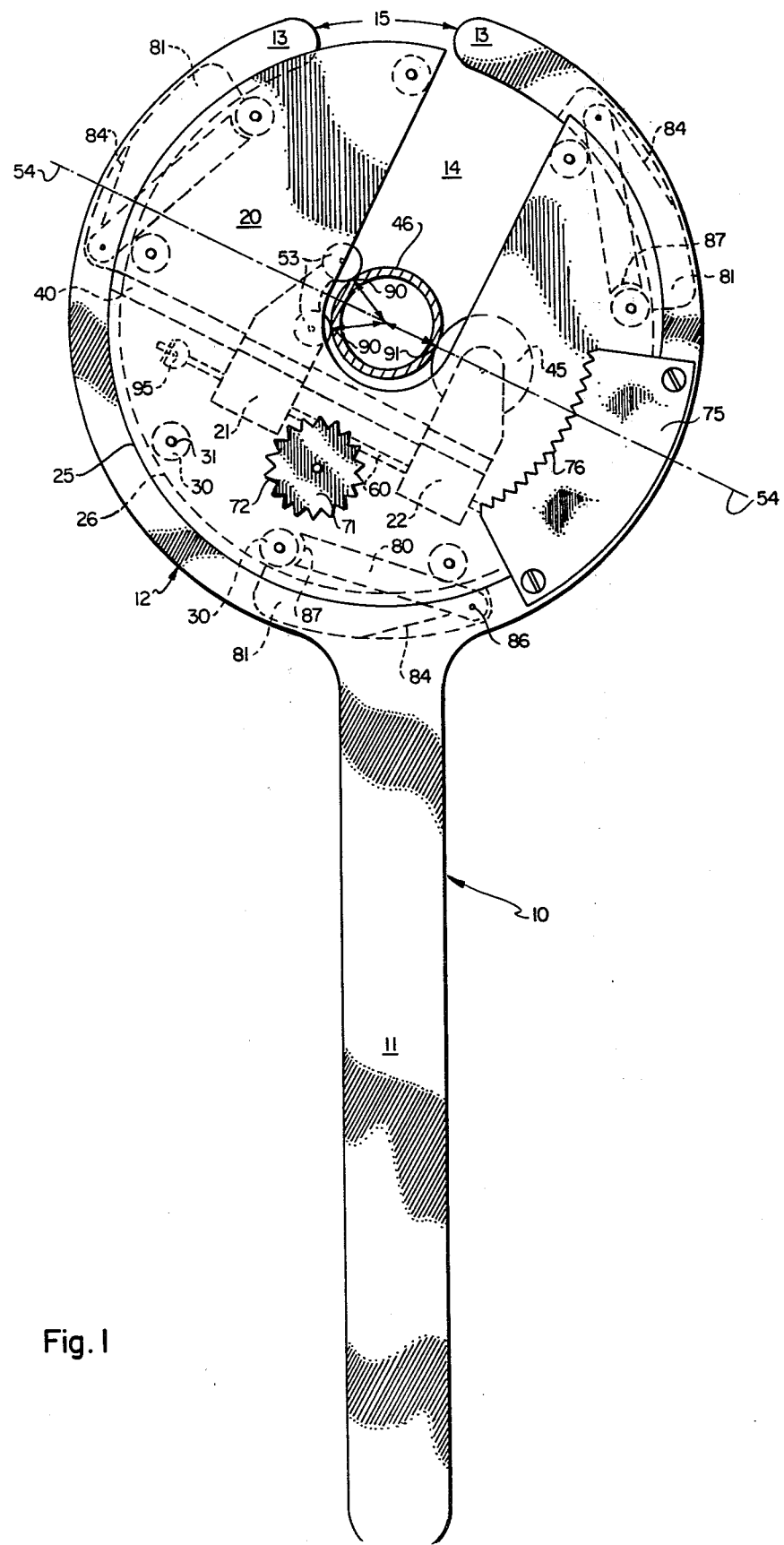
FIG. 1 shows a plan top view of the subject self centering pipe cutting device.

Referring now to the drawings:

A pipe cutting device in accordance with the subject invention includes a handle assembly 10 having a handle section 11 and a cutter support frame 12 affixed to one end of the handle section 11. The handle section may be formed in any convenient configuration to facilitate ease in gripping and is configured in length and size to fit within small areas where working access to a pipe is otherwise limited.

The attached cutter support frame 12 is shown as an integral part of the handle assembly 10 which may be formed of a single piece of metal having sufficient strength to withstand the stress typically applied during rotation of the pipe cutter device.

As illustrated, the cutter support frame 12 comprises a pair of arcuate arms 13 which frame a circular opening 14 in which the actual cutting device operates. The respective arcuate arms 13 terminate to form a gap 15 whose span is large enough to permit passage of a pipe which is intended to be cut within the device. Typically, such a gap will range from one to one and one-half inches in length.

Although other geometric configurations may be utilized for the cutter support frame 12, the circular configuration is well adapted for this device because of the rotational path of the cutting hardware which is supported thereon. Also, the location of the gap 15 between the terminal ends of the arcuate arms 13 is not critical to the operation of the invention. In the present figure, the gap is shown at the distal end of the device to facilitate implacement of the subject device around the prospective pipe to be cut. By aligning the gap with the longitudinal axis of the handle section 11, the worker can retain an orientation of the gap position under circumstances in which the worker's view is partially or totally obscured.

A pair of cutter guide plates 20 are rotatably positioned on opposing sides of the support frame 12 and operate as guide plates to control the path of the roller assembly 21 and cutter assembly 22. The cutter guide plates 20 are circular in configuration and have a radius slightly larger than the radius of the opening 14 of the cutter support frame. This configuration permits the top and bottom surfaces of the cutter support frame to operate as a guide surface in contact with the perimeter of the respective interior faces 23 and 24 of the respective guide plates. This perimeter contact is illustrated in FIG. 1 by the perimeter overlap of the guide plate 20 (shown in solid line at item 25) and the interior rim 26 of the cutter support frame shown in phantom line.

The cutter guide plates are maintained in relative concentric orientation with respect to the cutter support frame by ratchet rollers which are fixed between the respective guide plates 20 on roller pins 31 which seat in the respective guide plates in locations such that the respective ratchet rollers 30 define an outer perimeter substantially in common with the inner rim 26 of the cutter support frame. The ratchet pins may be seated in corresponding holes 32 by frictional contact, wherein the terminal ends of each pin are somewhat tapered and the respective pin holes 32 are correspondingly tapered for a tight fit. As an alternative, the pin ends may be threaded, with corresponding threads being formed within each of the pinned holes 32.

In the illustrated configuration, the ratchet pins operate to space the respective guide plates an adequate distance apart such that the rotational movement thereof about the common axis 35 is not impaired by frictional contact at the top and bottom surfaces of the cutter support frame 12. Ideally, the respective interior faces 23 and 24 of the guide plates would be in substantial parallel orientation with respect to each other, with minimal clearance between the top and bottom faces of the cutter support frame to prevent wobbling of the cutter guide plates during rotation.

Each of the guide plates 20 has an elongate opening 37 which is preferably equal in size to the gap 15 between the arcuate arms 13 of the support frame 12. It will be apparent that this common size facilitates receiving the prospective pipe within the cutting device. This elongate opening 37 extends from a central location with the common axis 35 through the perimeter of the guide plate to provide a channel for access of the prospective pipe. Alignment of the respective elongate openings 37 in each guide plate is essential to permit implacement of the pipe within the central location of the cutting device. This elongate opening 37 should be sufficiently deep within the guide plate to permit the pipe to have its longitudinal axis common with the common axis 35 of the cutter support frame rim 26 and guide plates 20. The guide plates further comprise a pair of linear track guides coupled to the interior faces thereof which operate to form the respective tracks along which the cutter assembly and roller assembly reciprocate in their converging and diverging paths. As illustrated in the figures, the track guides 40 may be directly formed into the guide plates as slots which are located toward the center of each plate and are oriented across a plate section which is not interrupted by the elongate slot 37. The location of these respective track guides helps to stabilize the respective cutter and roller assemblies by reducing the distance which these respective assemblies must project to operate at the surface of an inserted pipe.

The respective guide plates are coupled on opposing sides of the cutter support frame in orientation such that the respective linear track guides 40 are in parallel relationship, which relationship defines the movement path of the respective cutter and roller assemblies.

It will now be noted from the accompanying drawings that the mounted guide plates with their respective linear track guides form the operating housing for the respective cutter and roller assemblies. The cutter assembly 22 includes a tracking body 41 which operates to provide a platform for the upper and lower tracking means 42 which are configured to fit within the respective track guides 40 on the interior faces of the respective guide plates 20. It will be apparent that other tracking arrangements can be developed which implement the same principal as illustrated in the subject invention. Therefore, the guide studs 42 which constitute the tracking means on the cutter assembly are merely representative of numerous types of tracking means and tracking guide combinations.

The cutter assembly further includes a cutting tool 45 which is mounted at an edge of the cutter assembly toward the center of the guide plates when in tracking position. This orientation provides the ability for the cutting tool to contact and cut an external circumferential path around an inserted pipe 46 (as shown in FIG. 1).

Although other types of cutting tools may be utilized in accordance with the invention disclosed herein, the specific embodiment selected is a cutting wheel 45 which is journaled on an axle 47 supported at the remote edge of the cutter assembly and in a slotted housing 48. Proper positioning of the cutter assembly with respect to the tracking means 42 results in the positioning of the cutter wheel axle on a parallel line passing through the projected cutting point of contact of the cutting tool and through a diameter of the pipe 46 which is being cut.

In opposing orientation from the cutter assembly is the roller assembly 21. Like the cutter assembly, the roller assembly includes a tracking body 50 and upper and lower tracking means 51 which are configured to fit within the respective track guides on the guide plates 20. It should be noted that the upper and lower tracking means on each of the cutter and roller assemblies are traversing the same track along a linear path. The roller assembly further comprises a pair of support rollers 53 rotatably mounted at an edge of the roller assembly toward the center of the guide plates in opposing orientation to the cutting tool. The proper positioning of the pair of support rollers places them in an orientation such that a line parallel to the linear track guides and passing through the projected cutting or contact point of the cutter tool also passes midway between the pair of support rollers as illustrated by line 54 in FIG. 1. By maintaining this relationship, stability of the cutter tool and pipe is greatly improved throughout the sequence of cutting.

Here again, guide studs 51 are shown as the upper and lower tracking means coupled to the roller assembly. Obviously, simplicity of construction will normally dictate that the respective guide studs on the roller and cutting assemblies will be substantially identical to conform to the pair of track guides formed in the guide plates, which provide the single tracking path. It is conceivable, however, that since the respective cutter and roller assemblies operate on separate halves of the respective guide plates, a track guide/track means combination may be varied. For example, where additional strength is needed in the roller assembly, a heavier guide stud could be utilized, in combination with a deeper linear track guide on the roller assembly half of the guide plate.

Movement of the respective cutter 45 and roller 53 assemblies along their respective tracks is controlled by an advance screw 60 having a centrally located ring gear 61 in the approximate midsection of said advance screw. This combination operates as an adjustment means and is coupled to the cutter assembly 45 on one end and the roller assembly 53 on the other end by means of respective threaded housings 63 and 64, the thread orientation thereof being opposite to the corresponding section of the advance screw.

The advance screw 60, on the other hand, has opposing threaded orientations on each side of the ring gear 61. Therefore, as the advance screw rotates, the respective cutter 45 and roller assemblies 53 will shift in a converging or diverging direction, depending upon the direction of rotation of the advance screw 60. Therefore, the operation of the adjustment means is to simultaneously move the cutter and roller assemblies in converging and diverging directions, which directions are parallel with the parallel line 54 (FIG. 1) passing through the cutter tool and midsection of the roller pair.

The adjustment means is rotated at its central ring gear 61 by a drive means which includes a worm gear drive 65 applied at the central ring gear 61 which is fixed and immovable with respect to the advance screw 60. The worm gear drive includes an axle 66 which is shown coupled to an automatic advancement gear means 70 operable to rotate the axle and fixed worm gear attached thereto. This automatic gear means 70 includes a gear wheel 71 which is mounted at the end of the projecting axle 66 and has gear teeth 72 forming the perimeter of the gear wheel. A set screw 73 is provided to fix the automatic gear means 70 with respect to the worm gear drive axle 66. Therefore, as the automatic advance gear means 70 rotates, the advance screw is likewise rotated, causing the movement of the respective roller and cutter assemblies.

The automatic advancement feature arises from the use of a fixed arcuate gear plate 75 whose inner rim 76 has corresponding gear teeth to conform with the teeth of the gear wheel 72. The gear plate 75 is mounted by screws 78 with spacers 79 to the cutter support frame such that rotational movement of the gear plate is prevented.

The automatic advance gear means 70 is set on the worm gear drive axle 66 such that the gear wheel teeth 72 contact the gear plate teeth 76 as the guide plate combination 20 rotates the automatic advancement gear 70 into contact with the fixed gear plate 75.

This relationship can be seen more clearly in FIG. 1 which illustrates the concurrent location of each of the respective gear teeth 72 and 76 following on an imaginary circumference of a circle concentric with the axis of rotation of the cutter guide plate 20. It will therefore be apparent that one full rotation of the cutter guide plate through 360 degrees shall cause the worm gear drive and attached advance screw to rotate an amount which is determined by the length of the gear plate 75 and radius of the gear wheel 71. Therefore, the rate of advancement of the cutter tool 45 along its converging path on the pipe 46 can be controlled by the use of variable gear wheels 71 or gear plates 75.

Figure 2:
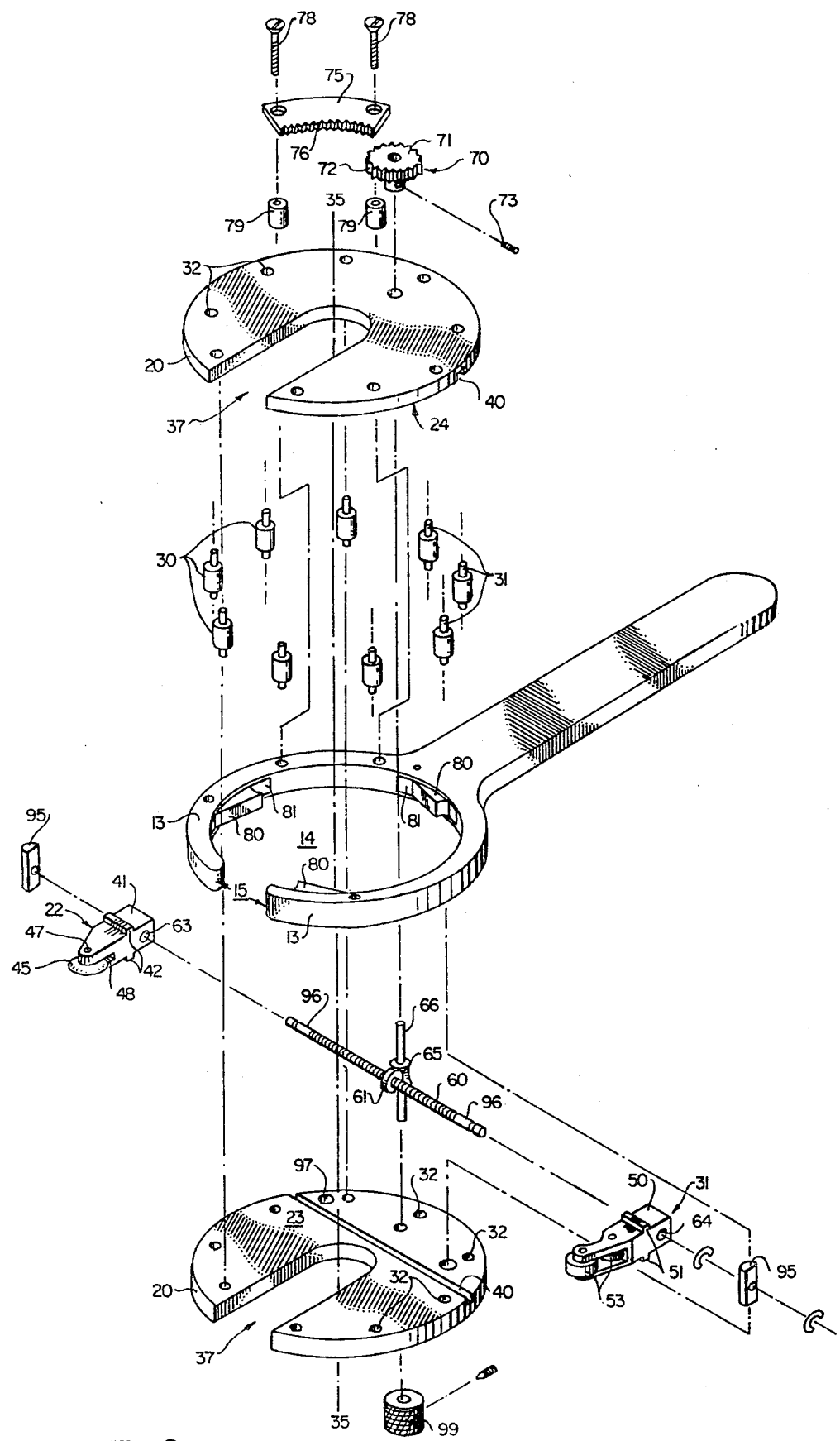
FIG. 2 depicts an exploded view of the subject pipe cutter with parts shown in perspective.

The rotation of the cutter guide plate is developed by a ratchet and pawl means which is coupled between the cutter support frame and rotatable guide plates such that the rotational movement of the guide plates is advanced in one direction only. An illustrative ratchet and pawl means is shown in the Figures as comprising ratchet rollers 30 with pins 31 mounted between the respective cutting guide plates as previously disclosed. In addition to providing proper spacing between the guide plates, the ratchet rollers operate against pawl means 80 which are housed within the interior rim 81 of the cutter support frame 13. These pawl means operate in standard manner by permitting advancement of the ratchet rollers 30 in clockwise orientation over the respective pawl means, which are impressed into the rim housing 81 as illustrated in FIG. 1. Each pawl means is spring biased in its projecting position as shown in FIG. 2 by a leaf spring 84 (FIG. 1). As the ratchet roller 30 advances past the pawl means 80, the pawl means springs to its projecting position. This action occurs during counterclockwise movement where the ratchet roller makes initial contact at the pawl means 80 toward its hinged side 86 (FIG. 1).

When the handle assembly and guide plate are advanced in clockwise orientation, the ratchet rollers are caught at the contoured face 87 of the pawl means. Further rotation in clockwise manner causes the forced advancement of the ratchet roller and attached guide plate in clockwise rotation as well.

Operation of the subject cutter is therefore accomplished by inserting a pipe 46 through the gap 15 and into the elongate slot 37, where it is approximately located at the central axis of the guide plate combination. The cutter and roller assemblies are converged concurrently into pipe 46 contact by turning thumb screw 99. This contact between the cutter and roller assemblies develops radial forces which occur at the two respective contact points of the roller wheels and the cutting contact by the cutting tool at pipe location 91. This contact establishes the orientation of a parallel line extending through the cutter contact 91 and midway between the roller assemblies and their respective contacts 90. Also concurrent with this line is a diameter of the pipe to improve a stable retention of the pipe in a grip between the roller pair and cutting tool.

With the pipe firmly supported in this manner, the handle assembly is advanced in clockwise orientation to cause the cutter tool to make a full 360 degree cut around the pipe exterior. Near completion of the 360 degree rotation, the automatic advancement gear 71 contacts the gear plate 75, causing gradual rotation of the worm gear and advance screw and moving the respective cutter and roller assemblies in converging direction. Correspondingly, the cutting radius of the cutting tool is shortened and the pipe is now prepared for a second pass of the cutting tool with a deeper cut. By repeating the clockwise rotation of the guide plates, the cutting action and continued advancement of the cutter and roller assemblies is accomplished.

The action of converging the roller assembly concurrent with the cutter assembly operates to increase the support and stability as the cutting operation advances toward its completion. Although this converging action causes the pipe to shift slightly off center by repeating the clockwise rotation of the guide plates, the cutting action and continued advancement of the cutter and roller assemblies is accomplished.

The action of converging the roller assembly concurrent with the cutter assembly operates to increase the support and stability as the cutting operation advances toward its completion. Although this converging action causes the pipe to shift slightly off center from the axis of rotation of the cutter guide plate, such dislocation is insignificant where the pipe wall thickness is less than approximately one-eighth inch. Furthermore, use of compressible rubber wheels as the roller pair permits some compressional give in the roller wheels themselves during the converging action.

The cutter assembly and roller assembly are further stabilized by use of screw retainers at 95 mounted on unthreaded sections 96 of the advance screw. These screw retainers 95 are fed in openings 97 configured to their respective shapes. Use of such screw retainers 95 prevents oscillation and dislocation of the advance screw while being rotated during operation of the cutter and roller assembly.

The subject invention provides a significant advancement over prior art cutting tools inasmuch as automatic operation is developed by an inexpensive combination of mechanical elements which cooperate in a unique and surprising manner to provide the proper positioning and application of forces to develop a desired cutting path and operation with respect to a pipe. During such cutting operation, the pipe is fully supported and retained in firm grip such that oscillation is avoided and dislocation from the cutting path is minimized. Furthermore, the small size of this cutting tool enables its use in restricted areas between floor joists and in narrow trenches where hand movement of the worker is severely limited.

Other benefits of the subject invention which assist in developing the unexpected improved pipe cutting operation will be apparent to those skilled in the art, as well as deviations from the specific mechanical features disclosed. For example, springs can be positioned on the exterior sides of the cutter and roller assemblies, to be utilized as part of the advancement means as disclosed in this application. Therefore, it is to be understood that the scope of this invention is to be limited by the appended claims, and not by the mechanical features expressly set forth in the preferred embodiment.

I claim:
1. A self centering pipe cutting device comprising:
 a handle assembly including (i) a handle section configured in length and size to fit within small areas where working access to a pipe is otherwise limited, and (ii) a cutter support frame affixed to one end of said handle and configured to partially circumscribe a pipe cutting area, said frame including a gap having a width sufficient to permit passage of a section of pipe therethrough;
 a pair of cutter guide plates rotatably positioned on opposing sides of said support frame and including means for coupling the respective plates into fixed, substantially parallel orientation with respect to each other, said cutter guide plates each having an elongate opening in size equal to the frame gap width and extending in common alignment from a central location of each plate through its perimeter to provide access means for insertion of a pipe to the central location of the guide plates;
 a pair of linear track guides respectively formed along the interior faces of the guide plates and in parallel orientation, said track guides being located toward the center of each plate and across a plate section uninterrupted by said elongate openings;
 a cutter assembly including a tracking body with upper and lower tracking means configured to travel said respective linear track guides on the opposing inner faces of the cutter guide plates, said cutter assembly further comprising a cutting tool mounted at an edge of the cutter assembly toward the center of the guide plates when in tracking position, and in an orientation adapted for contract- ing and cutting an external circumferential path around an inserted pipe;

a roller support assembly including a tracking body with upper and lower tracking means configured to travel said respective linear track guides on the opposing inner faces of said guide plates, said roller assembly further comprising a pair of support rollers rotatably mounted at an edge of the roller assembly toward the center of the guide plates in opposing orientation to the cutting tool such that a line parallel to said linear track guides and passing through the point of projected cutting contact of said cutting tool also passes midway between the pair of support rollers;

adjustment means coupled to the cutter assembly at one end and the roller assembly at the other end and having rotational drive means attached to the cutter support frame as opposed to the handle section and adapted for adjustment operation by mere rotation of the handle assembly about the pipe cutting area to simultaneously move the cutter and roller assemblies in converging or diverging direction, depending on the direction of force applied to the drive means, said converging and diverging directions being parallel with said parallel line passing through the cutter tool and midsection of the roller pair; and ratchet and pawl means coupled between the cutter support frame and rotatable guide plates, said ratchet and pawl means being operable to actuate rotational movement of the guide plates and attached cutter and roller assemblies when the handle assembly is rotated in one direction, without counter guide plate rotation upon reverse directional movement of the handle assembly.

2. A self centering pipe cutting device as defined in claim 1 wherein the cutter support frame comprises a pair of arcuate arms which frame a circular opening slightly smaller than the diameter of the cutter guide plates, said arms terminating to form a gap whose span is large enough to permit passage of a pipe having an outer diameter of up to one and one-half inches.

3. A self centering pipe cutting device as defined in claim 1, wherein the linear track guides formed in the cutter guide plates comprise slotted tracks, and the respective upper and lower tracking means of the cutter and roller assemblies comprise guide studs whose size and configuration conform to the interior dimensions of the respective slotted tracks in the guide plates.

4. A self centering pipe cutting device as defined in claim 1, wherein the cutting tool comprises a cutting wheel journaled on an axle supported at the remote edge of the cutter assembly in a slotted housing, said axle being positioned on the parallel line passing through the projected cutting point of contact of the cutting tool.

5. A self centering pipe cutting device as defined in claim 1 wherein the adjustment means coupled to the cutter and roller assemblies comprises an advance screw having a centrally located ring gear which is immovable with respect to the advance screw, each side of said advance screw having an opposing thread orientation with respect to the central ring gear adapted to cause converging or diverging movement of said cutter and roller assemblies, each of said assemblies being mounted on the advance screw by means of a threaded hole passing through each respective tracking body in parallel orientation with respect to the respective tracking means of the roller and cutter assemblies said holes having a common direction of thread orientation.

6. A self centering pipe cutting device as defined in claim 5 wherein the drive means includes a worm gear drive applied at the central gear of the advance screw upon which the respective cutter and roller assemblies are mounted.

7. A self centering pipe cutting device as defined in claim 1, wherein the ratchet and pawl means comprises ratchet rollers with pins mounted between the respective cutting guide plates at substantial equidistant locations around the near perimeter of the guide plates, said ratchet rollers being operable to space the guide plates a proper distance from each other to adapt the cutter and roller assemblies for proper tracking therebetween, said pawl means being housed within the interior rim of the cutter support frame and having a common direction of operation and spring biasing means to retain the pawl in a projecting position from the interior rim, subject to a depressing force applied by the ratchet rollers to cause recession of the pawl into a housing formed within the cutter support frame.

8. A self-centering pipe cutting device comprising:

a handle assembly including (i) a handle section configured in length and size to fit within small areas where working access to a pipe is otherwise limited, and (ii) a cutter support frame affixed to one end of said handle and configured to partially circumscribe a pipe cutting area, said frame including a gap having a width sufficient to permit passage of a section of pipe therethrough;

a pair of cutter guide plates rotatably positioned on opposing sides of said support frame and including means for coupling the respective plates into fixed, substantially parallel orientation with respect to each other, said cutter guide plates having an elongate opening in size equal to the frame gap width and extending in common alignment from a central location of each plate through its perimeter to provide access means for insertion of a pipe to the central location of the guide plates;

a pair of linear track guides respectively formed along the interior faces of the guide plates and in parallel orientation, said track guides being located toward the center of each plate and across a plate section uninterrupted by said elongate openings;

a cutter assembly including a tracking body with upper and lower tracking means configured to travel said respective linear track guides on the opposing inner faces of the cutter guide plates, said cutter assembly further comprising a cutting tool mounted at an edge of the cutter assembly toward the center of the guide plates when in tracking position, and in an orientation adapted for contacting and cutting an external circumferential path around an inserted pipe;

a roller support assembly including a tracking body with upper and lower tracking means configured to travel said respective linear track guides on the opposing inner faces of said guide plates, said roller assembly further comprising a pair of support rollers rotatably mounted at an edge of the roller assembly toward the center of the guide plates in opposing orientation to the cutting tool such that a line parallel to said linear track guides and passing through the point of projected cutting contact of said cutting tool also passes midway between the pair of support rollers;

adjustment means coupled to the cutter assembly at one end and the roller assembly at the other end and having drive means to simultaneously move the cutter and roller assemblies in converging or diverging direction, depending on the direction of force applied to the drive means, said converging and diverging directions being parallel with said parallel line passing through the cutter tool and midsection of the roller pair;

ratchet and pawl means coupled between the cutter support frame and rotatable guide plates, said ratchet and pawl means being operable to actuate rotational movement of the guide plates and attached cutter and roller assemblies when the handle assembly is rotated in one direction, without counter guide plate rotation upon reverse directional movement of the handle assembly;

adjustment means coupled to the cutter and roller assemblies comprising an advance screw having a centrally located ring gear which is immovable with respect to the advance screw, each side of said advance screw having an opposing thread orientation with respect to the central ring gear adapted to cause converging or diverging movement of said cutter and roller assemblies, each of said assemblies being mounted on the advance screw by means of a threaded hole passing through each respective tracking body in parallel orientation with respect to the respective tracking means of the roller and cutter assemblies, said holes having a common direction of thread orientation;

said drive means including a worm gear drive applied at the central gear of the advance screw upon which the respective cutter and roller assemblies are mounted; and said drive means further comprising an automatic advance gear means for rotating the worm gear drive and coupled advance screw adjustment means in response to rotational movement of the cutter guide plate, said automatic advance gear means including a gear wheel mounted at the end of a projecting axle from the worm gear drive, and a fixed, arcuate gear plate whose inner rim has corresponding gear teeth to conform with the teeth of the gear wheel mounted at the axle of the worm gear drive, said gear wheel being mounted on the exterior side of the cutter guide plate with its gear teeth positioned on an imaginary circumference of a circle concentric with the axis of rotation for the cutter guide plate, said arcuate gear plate having its gear teeth falling substantially on the same imaginary circumference, said gear plate being mounted in fixed position on the handle assembly such that passage of the gear wheel across the gear plate actuates rotational motion of the gear wheel to cause corresponding rotation of the worm gear drive and advance screw.

* * * * *